Figure 1:
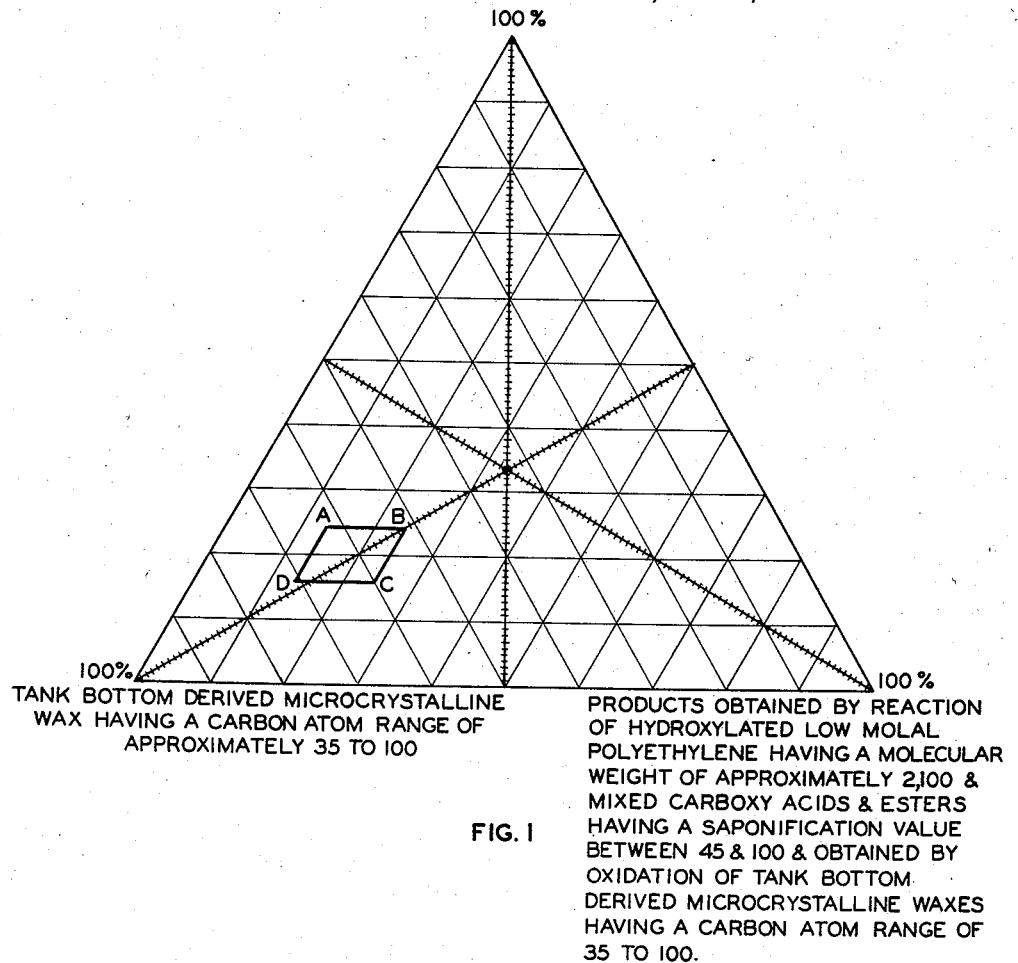

March 24, 1959 M. DE GROOTE ET AL 2,879,240
PROCESS OF OXIDIZING MIXTURE OF MICROCRYSTALLINE
WAX, AN ESTER OF HYDROXYLATED POLYETHYLENE AND
POLYETHYLENE, AND PRODUCT PRODUCED THEREBY
Filed March 10, 1955 4 Sheets-Sheet 1

FIG. I

INVENTORS
Melvin De Groote
Franklin E. Mange

INVENTORS
Melvin De Groote
Franklin E. Mange

United States Patent Office 2,879,240
Patented Mar. 24, 1959

2,879,240

PROCESS OF OXIDIZING MIXTURE OF MICRO-CRYSTALLINE WAX, AN ESTER OF HYDROXYLATED POLYETHYLENE AND POLYETHYLENE, AND PRODUCT PRODUCED THEREBY

Melvin De Groote, University City, and Franklin E. Mange, Clayton, Mo., assignors to Petrolite Corporation, Wilmington, Del., a corporation of Delaware Application March 10, 1955, Serial No. 493,464

8 Claims. (Cl. 260—28.5)

The present invention is a continuation-in-part of our co-pending application, Serial No. 418,382, filed March 24, 1954, now abandoned. See also our co-pending application, Serial No. 493,465, filed March 10, 1955.

The present invention is concerned with a process of oxidizing a three-component mixture consisting of (A) refined tank bottom-derived microcrystalline wax having a carbon atom range of approximately 35 to 100; said wax being characterized by the following characteristics: (aa) oxidation susceptible in conventional gaseous oxygen-containing oxidation procedure; (bb) immiscible with polystyrene of molecular weight range of 5,000 to 10,000 at approximately 160° C., and (cc) has not been rendered oxidation susceptible by subjecting to treatment with a member of the class consisting of a metallic halide, hydrochloric acid and chlorinated hydrocarbon; (B) esters obtained by reaction between a low molal polyethylene having a molecular weight of approximately 2,100; said polyethylene having a terminal hydroxyl group, said hydroxylated polyethylene being produced by polymerizing ethylene under 425–475 atmospheres at temperatures between 140° and 200° C. in the presence of isopropanol and hydrogen peroxide; and mixed acids and esters thereof having a saponification value between 35 and 100 and obtained by oxidation of a microcrystalline wax as described in (A) above; (C) a normal commercial polyethylene defined by the small shaded rectangular band of Figure 4; in such weight proportions so that the average composition of said initial reactants lies approximately within the parallelogram A, B, C, D, of the accompanying drawing, Figure 1; said oxidation comprising treatment with an oxygen-containing gas in presence of not over 2% of a conventional oxidation-promoting catalyst at a temperature sufficiently above the boiling point of water for a period of time in gas flow rate to cause formation of (a) hydroxyl containing molecules; (b) carboxyl containing molecules, followed by (c) esterification, and (d) subsequent reactions including at least one of the following, alcoholysis and ester-interchange; said resultant product having an acid number of not less than 12, and a saponification number of not less than 35, and having a combined oxygen content of not less than 2%; with the proviso that the initial ratio of high molal polyethylene, low molal hydroxylated polyethylene, and all refined tank bottom-derived microcrystalline wax entering into the final reaction mass be within the limits defined by the parallelogram E, F, G, H, in Figure 5.

A variety of hydrocarbon waxes and comparable compounds principally hydrocarbon in nature have been subjected to oxidation in various manners and particularly by the use of air, ozone, or oxygen in the presence of an oxidation catalyst, such as a wax soluble organic salt, such as manganese or cobalt naphthenate.

The waxes employed for oxidation may be obtained by various procedures; for instance, they may be obtained in processes involving the production of lubricating oil, or in processes conducted primarily for the recovery of wax; or they may be obtained from sediment in crude oil itself, i. e. commonly referred to as "tank bottoms."

The present invention is limited to a combination employing (a) a specific type of microcrystalline wax derived from tank bottoms as differentiated from the broad class; (b) esters or comparable reaction products obtained by reaction between mixed carboxy acids and esters thereof derived from microcrystalline wax on the one hand and a low molal hydroxylated polyethylene (molecular weight approximately 2000) on the other hand; and (c) a conventional type of comparatively high molal polyethylene having a molecular weight within the range of 12,000 to 32,000.

The recovery and production of microcrystalline wax is well known and has been described in the literature. See, for example, U.S. Patent No. 2,443,840, dated June 22, 1948, to Stossel.

Recovery of tank bottom waxes is conducted principally in the middle western oil fields, in Kansas, Oklahoma, Louisiana, and Texas as well as elsewhere to a lesser degree. The difference in tank bottom waxes can be illustrated by reference to those found in a single State, to wit, Texas. The composition of tank bottom waxes has been approximately determined. In each instance the tank bottom wax is a mixture principally of hydrocarbon material containing perhaps a trace of some other elements in chemical combination, not infrequently oxygen, and sometimes nitrogen and sulphur. Although there usually is only a trace of elements other than carbon and hydrogen yet such trace in combination with a molecule having 35 to 100 carbon atoms may actually have significance which is somewhat obscure and subtle.

Although the tank bottom waxes are largely paraffinic in nature one cannot necessarily rule out the fact that a molecule having 35 to 100 carbon atoms may or may not have some other structure such as an aryl structure or more likely an alicyclic structure.

Even in light of what has been said previously there is no explanation for a fact that has been recognized for years, to wit, that microcrystalline waxes, and for that matter one could limit oneself to those found in Texas, fall into two classes; one class consists of oxidation-susceptible microcrystalline waxes which can be oxidized readily using a conventional catalyst and using a well known procedure such as the kind described in the article entitled "Oxidation of Paraffins," by Dr. Ernest Stossel, which appeared in the Oil and Gas Journal, issues of July 21, August 18, September 1, 1945. The other class of microcrystalline waxes appears to be identical in most respects but for some reason these are not oxidation susceptible by conventional means. They are just as valuable for many purposes as the oxidation-susceptible waxes and for some purposes perhaps even more valuable.

Purely for purpose of illustration, immediately following and identified as Table I, is a table showing oxidation

TABLE I

| | Duration of Oxidation, hours | Temperature, ° F. | Acid No. of Product |
|---|---|---|---|
| East Texas Wax | 16 | 330 | 31.6 |
| West Texas Wax | 24 | 330 | 1.9 |
| West Texas Wax (aluminum chloride treated) | 8 | 330 | 26.1 | of the West Texas microcrystalline wax (non-oxidation susceptible), the oxidation of an East Texas microcrystalline wax (oxidation susceptible), and the oxidation of an aluminum chloride treated West Texas microcrystalline wax, all three waxes being oxidized under the same conditions.

As has been pointed out elsewhere, one can select two different microcrystalline waxes, both obtained from tank bottoms and both possibly obtained from the same State, for instance, from various Texas oil fields, which are characterized by substantially the same physical properties by conventional measurements. However, from the standpoint of oxidation susceptibility by means of gaseous oxidation it is found that one class is non-susceptible and the other one is susceptible. The non-susceptible type of wax when reacted with aluminum chloride or other halides, such as hydrochloric acid, or certain Friedel-Crafts catalysts, becomes oxidation susceptible. The above aluminum chloride treatment was accomplished by heating for approximately 7 hours at 100° C. The amount of aluminum chloride used was 10%. Lesser amounts can be used. Such treatment has been described in the patent literature.

The present invention is concerned with the use of oxidation susceptible microcrystalline waxes derived from tank bottoms and preferably the oxidation susceptible microcrystalline waxes from tank bottoms as found in the East Texas oil fields. As has been pointed out it is not known whether oxidation is prevented by the presence of a naturally occurring anti-oxidant or whether some other cause is involved. In some instances non-oxidation susceptible waxes, particularly of the kind derived from West Texas, can be rendered oxidation susceptible by vigorous treatment with a metallic chloride which apparently causes some obscure change, the character of which is not known.

As to the treatment of microcrystalline wax with aluminum chloride or the like, see U.S. Patent No. 2,471,102 to Fish.

Having selected an oxidation susceptible wax of the kind above described, it is to be noted for the present purpose it must meet another requirement. Certain microcrystalline waxes derived in the conventional manner apparently mix with a large variety of olefin polymers at their melting point or somewhat above, for instance, 160° C. For instance, one such polymer is polystyrene. We have used the lowest molecular weight of polystyrene available from a commercial source as a screening test to select the appropriate tank bottom wax. Our method of screening is as follows: We mix 5 grams of polystyrene (5,000 or 10,000 molecular weight) with 95 grams of the microcrystalline wax and if after stirring for 4 hours at 160° C. one does not obtain a homogeneous mixture the wax is satisfactory for use in the present invention. If one does obtain a homogeneous mixture the wax is not suitable for the present invention.

Reference has been made to pre-treatment with a metallic salt, particularly a metallic halide such as, for example, aluminum chloride. Chlorinated hydrocarbons and particularly chlorinated paraffin has been suggested for this purpose. Hydrochloric acid is sometimes satisfactory for the same purpose.

In the hereto appended claims the wax employed is characterized by the following characteristics: (a) oxidation susceptible in a conventional procedure (b) immiscible with polystyrene 5,000 or 10,000 molecular weight at approximately 160° C. and (c) not been subjected to treatment with a metallic halide hydrochloric acid, or a chlorine containing hydrocarbon compound.

The present invention includes the use of a polyethylene. Polyethylenes cover a variety of products running in molecular weights from 1,000 to almost 100,000. The bulk of those sold in commerce range from 15,000 to 25,000 molecular weight. There are certain low molal polyethylenes having a molecular weight in the range of 1,000 to 5,000. Although a number of these have been prepared in the present invention we prefer to use the type described in U.S. Patent No. 2,504,400, dated April 18, 1950, to Erchak. Said patent characterizes the product in terms of the method of manufacture which is a process for the production of at least medium hard, high-melting waxes from ethylene which comprises maintaining ethylene under pressures between about 425 and 475 atmospheres and at temperatures between about 140° C. and 200° C. in contact with isopropanol in amount sufficient to occupy from about 5% to about 10% of the total volume of the reaction zone and containing from about 0.1 to about 2% by weight on the isopropanol of hydrogen peroxide on a 100% hydrogen peroxide basis.

The peculiar characteristics of low molal hydroxylated polyethylene has been recognized and the particular type of material herein employed is one of the components of reactants also as described in U.S. Patent No. 2,698,309 dated December 28, 1954, to Thwaites et al. For instance, in the last mentioned patent a product is identified as a wax composition comprising paraffin wax containing from 0.5 to 10% by weight of a mixture of polyethylene and 40 to 60% by weight based on total polymer of polyethylene having a terminal hydroxyl group, said hydroxylated polyethylene being produced by polymerizing ethylene under 425–475 atmospheres at temperatures between 140° to 200° C. in the presence of isopropanol and hydrogen peroxide.

Although oxidized wax can be saponified and acidified and the acidified mass employed for the herein described process nothing is gained by doing so for the reason that the product of reaction obtained by employing the hydroxylated low molal polyethylene with the oxidized wax is sufficient in light of esterification, trans-esterification, alcoholysis or the like to yield a perfectly satisfactory product for the herein described purpose.

For purpose of convenience what is said hereinafter will be divided into seven parts:

Part 1 is concerned with suitable tank bottom derived microcrystalline wax, and some phases of its oxidation;

Part 2 is concerned with the conventional high molal polyethylene;

Part 3 is concerned with the hydroxylated low molal polyethylene employed;

Part 4 is concerned with the reaction previously referred to involving the hydroxylated low molal polyethylene and the oxidized microcrystalline wax;

Part 5 is concerned with the limits of the components in the mixtures employed;

Part 6 is concerned with gaseous oxidation of the mixture and for convenience is divided into two sections; Section A is concerned with operative steps as the procedure is actually conducted, and Section B is concerned with the consideration of the probable reactions involved; and Part 7 is concerned with uses for the products derived in the manner described in Part 6, preceding.

PART 1

The paraffin wax employed in the present invention is characterized by being obtained from tank bottoms in the conventional manner. The procedure for recovery of such waxes is well known and materials are presently supplied commercially by at least three organizations. As has been pointed out elsewhere such waxes may or may not be oxidation susceptible by conventional gaseous oxidation procedure.

The tank bottom wax employed for the present purpose must be naturally oxidation susceptible, i.e., must not require treatment with some chemical compound such as aluminum chloride, hydrochloric acid, chlorinated paraffin, or the like, to render it oxidation susceptible. Generally speaking, the melting point of such waxes prior to oxidation is within the range of 150° to 200° F. The preferred range for the present purpose is a wax that melts at approximately within the range of 190° to 195° F. The color may vary from a pale straw to dark amber. Our preference is to use the lighter colored waxes such as would approximate pale amber, yellow, or straw, in color.

The oxidation of microcrystalline wax and particularly microcrystalline wax which is obtained from East Texas tank bottoms has been described in a number of patents. For sake of convenience reference is made to U.S. Patent No. 2,667,408, dated January 26, 1954, to Kleinholz. Reference in that particular patent is to carboxy acids obtained by oxidation of microcrystalline wax but the subject matter is perfectly satisfactory for the instant purpose.

"The carboxy acids used in accordance with the present invention are obtained by the oxidation of microcrystalline wax with the use of air or oxygen, or oxygen-enriched air as the oxidizing agent, advantageously with the use of a catalyst, for example, potassium permanganate in small quantities, for example, from about .1 to about 1% and with the use of a small amount of oxidized product from the previous run as seed. Elevated temperatures substantially above 100° F. are used for the oxidation with a reaction temperature in the range of about 230 to about 275° F. giving good results. The oxidation takes place over a prolonged period of time, for example, from about 40 to about 100 hours, with the degree of conversion of the wax to oxidized product, as determined, for example, by the saponification number of the reaction mixture increasing with time. The oxidation proceeds more rapidly if oxygen or oxygen-enriched air is used in place of air but the character of the reaction product does not seem to change substantially. The oxidation may advantageously be carried out until the product has a saponification number in excess of 100 and usually in excess of 200, e.g., 260, but the effectiveness of the material in inhibiting rusting or corrosion when incorporated in light petroleum distillates obtained on the basis of the oxidized material, does not seem to vary greatly as between products which have been oxidized to a saponification number but a little above 100 and products which have been oxidized to a substantially higher saponification number, for example, 260. The wax acids in general have a substantially higher saponification number than acid number, perhaps indicating the presence of lactones. Thus, typical products may have a saponification number of 221 with an acid number of 158, a saponification number of 150 with an acid number of 103, saponification number of 135 with acid number of 70, etc. The products have little unsaturation having iodine numbers ranging down from about 20 to almost 0.

"The microcrystalline wax is a common article of commerce. These waxes are obtained from petroleum residues or petroleum. They are generally regarded as containing some straight chain molecules and a large portion of both branched chain molecules and ring type molecules. Typical waxes have been shown by X-ray analyses to contain hydrocarbons in the $C_{34}$ to $C_{55}$ range.

"*Example 1a*

"Microcrystalline wax obtained from East Texas crude shown by X-ray analysis to consist of mixtures of hydrocarbons in the $C_{34}$ to $C_{55}$ range was oxidized after the addition of 0.15% potassium permanganate at a temperature of 110 to 130° C. by blowing with air at the rate of 165 liters of air per hour per kilogram of wax to a saponification number of 135. The product after acid and water washing (to remove potassium and manganese) had a saponification number of 135, an acid number of 70 and an iodine number of 10.3."

PART 2

High molal polyethylenes within the molecular weight range of 12,000 to 32,000 are marketed by a number of organizations and have been fully described in the literature. The various high molal polyethylenes may vary somewhat in respect to hardness, softening point, etc. The variation is largely one of physical properties from a standpoint of molding polyethylene which is its most important use. There is no evidence that high molal polyethylene includes either a hydroxyl group or a carboxyl group in the molecule or if it does it is not detectible by the usual methods of examination. It is well known that in numerous cases such high molal polyethylenes do contain a trace of oxygen although the manner in which the oxygen is combined is not completely understood.

Figure 4:
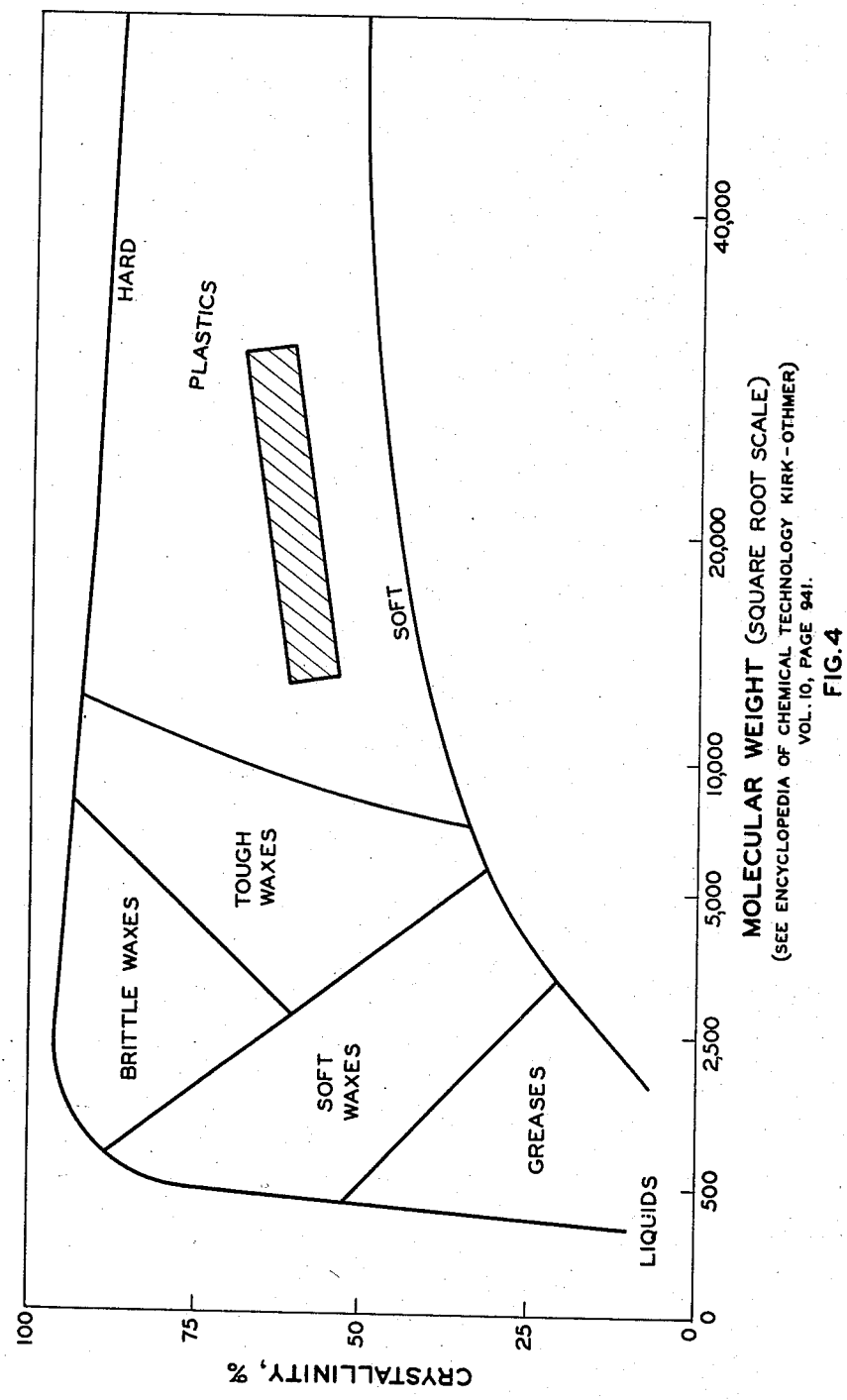

As to a more complete description of these polyethylenes suitable for the present purpose, reference is made to Kirk-Othmer, Encyclopedia of Chemical Technology, volume 10, page 938 et seq. Note the following statement which appears on page 940:

"A number of physical and mechanical properties are directly affected by the crystallinity and hence by the degree of branching. Examples are hardness, softening point, and yield point in tension. On the other hand, some properties, such as tensile strength, flexibility at low temperatures, and impact strength are principally a function of the average molecular weight. The wide range of types of polyethylene is a reflection of the wide variation in molecular weight and in degree of branching, and hence in crystallinity, which can be covered by alternations in the polymerization conditions. The interrelation of chain length crystallinity, and the nature of the polymer is shown in (Figure 4 hereto attached). The normal commercial polyethylenes, whose properties are described in the subsequent sections, lie within the small shade band in the center of the diagram."

In light of the above it seems the clearest description of the polyethylene of the kind herein described is by reference to the shaded band or rectangular area of Figure 4 which, as previously stated, is the Figure 1 referred to in the excerpt above.

PART 3

Such low molal polyethylenes having one hydroxyl and in all likelihood in the terminal position have been produced by various methods. One method of production is that described in aforementioned U.S. Patent No. 2,504,400. This type of polyethylene has been used for various purposes as illustrated by aforementioned U.S. Patent No. 2,698,309.

As has been pointed out previously, the appended claims include the same terminology for purpose of identification as appear in the claims of U.S. Patent No. 2,698,309.

Referring to Figure 4 it is obvious that the molecular weight of approximately 2100 (without differentiating the area as to soft waxes or brittle waxes, or a combination) is completely removed from the area of the shaded rectangle which characterizes the normal high molal polyethylenes.

PART 4

Acids, or acids derived by the oxidation of microcrystalline wax, have been described particularly in the patent literature; for instance, reference is made to U.S. Patent 2,667,408. Acids so obtained, or appropriate esters, can be combined with monohydroxylated polyethylene (M.W. 2100) to give an ester alone or an ester in combination with, or mixed with, the alcohol resulting from trans-esterification.

If an acid as differentiated from an ester is obtained, it can be esterified of course with hydroxylated polyethylene to give the ester. However, if the wax acid is combined as an ester then one is dependent on trans-esterification and in this case the ester obtained is mixed with the alcohol resulting from trans-esterification. Either procedure, both of which are conventional, are commonly employed in preparing esters derived from higher fatty acids such as stearic acid. Obviously the same procedure is equally suitable for preparation of esters from wax acids.

In any event, one can readily prepare the wax acid esters with hydroxylated polyethylene (M.W. 2100) in comparatively pure form or admixed with other products which are conventional components of oxidized microcrystalline wax as, for example, alcohols which are found in the cogeneric mixture as the result of reaction.

The other oxidized components in the oxidized microcrystalline wax appear to have no adverse effect on the trans-esterification reaction with the possible exception of the alcohols. Since most of the alcohols are not volatile at the temperature of the trans-esterification reaction there probably exists an equilibrium between the esters formed from the wax acids and the low molal polyethylene along with the free or freed wax alcohols and the hydroxy low molal polyethylene. However, it seems that most and perhaps essentially all of the low molal hydroxy polyethylene is esterified probably because the esters so derived are more resistant to alcoholysis than the considerably lower molecular weight wax esters.

As has been pointed out, oxidized wax of the kind herein described has a definite acid number and definite saponification number within the limits set forth. When a mixture of an acidic material and esters are reacted in the conventional manner with a hydroxylated material, such as the low molal polyethylene as herein described, a number of reactions take place. The more common ones, of course, are esterification and trans-esterification. Esterification, of course, represents a combination between the carboxyl group and the hydroxyl of the polyethylene. Trans-esterification is employed to indicate the change in an esterified compound where the alcoholic radical is replaced with the alcohol radical derived from low molal polyethylene and presumably the liberation of a wax derived alcohol or the equivalent thereof. The conditions under which such reaction, or reactions, take place are conventional and illustrated by the subsequent examples.

Example 1b

To 8.1 pounds of a hydroxylated low molal polyethylene (average molecular weight of approximately 2100) is added 5.1 pounds of an oxidized tank bottom-derived microcrystalline wax having an acid number of 35, a saponification number of 90, a melting point of 185° F. (as determined by the A.S.T.M. Test Method D127–30) and a penetration value of 6 (as determined by the A.S.T.M. Test Method D5–25). This mixture is heated to 280° F. and is maintained at approximately this temperature for 12 hours while a slow stream of carbon dioxide is bubbled through the reaction mixture. The carbon dioxide acts as a catalyst and also function to keep the product light colored by excluding air oxygen. This product has an acid number of 4 and a saponification number of 35. The 5.1 pounds of oxidized wax employed was obtained by the oxidation of 5 pounds of the microcrystalline wax, i.e., the microcrystalline wax oxidized in a larger batch of course increased approximately 2% in weight.

This example gives a procedure which yields a product which is useful for the purpose of this invention. Instead of using carbon dioxide a better catalyst such as sulfuric acid may be used but it causes other problems such as introducing dark color products and necessitating an additional step so as to remove it. The same also may be said of the basic metal alkoxides. Certain basic salts such as potassium or sodium carbonate may be used advantageously, but we think that carbon dioxide with a sufficiently high reaction temperature to carry out the reaction but not so high as to decompose the oxidized wax is the most satisfactory, e.g., temperatures of 270°–320° F.

The proportions of oxidized microcrystalline wax and low molal hydroxy polyethylene may be varied to give products useful for this invention. In addition, wax oxidized to different extents may be used such as illustrated in the following examples.

Example 2b

To 12 pounds of a hydroxy low molal polyethylene (average molecular weight approximately 2100) is added 8.1 pounds of an oxidized tank bottom-derived microcrystalline wax having an acid number of 20, a saponification number of 55, a melting point of 180° F. (as determined by the A.S.T.M. Test Method D–127–30) and a penetration value of 5 (as determined by the A.S.T.M. Test Method D5–25). This mixture is heated to 310° F. and is maintained at approximately this temperature for 12 hours while a slow stream of carbon dioxide is bubbled through the reaction mixture. The resultant product has an acid number of 3 and a saponification value of 30. The 8.1 pounds of oxidized wax employed was obtained by the oxidation of 8 pounds of the microcrystalline wax.

Example 3b

The same procedure was followed as in Example 2b, except that instead of using 8.1 pounds of the oxidized wax, 12 pounds of an oxidized wax having an acid number of 27 and a saponification number of 71 were employed. The 12 pounds of oxidized wax employed were obtained by the oxidation of 12 pounds of the microcrystalline wax.

Example 4b

The same procedure was followed as in Example 1b, except that instead of using 5.1 pounds of oxidized wax, 9.8 pounds of an oxidized wax having an acid number of 15 and a saponification value of 50, were used. The 9.8 pounds of oxidized wax employed were obtained by the oxidation of 10 pounds of the microcrystalline wax.

The reason for indicating the amount of precursory unoxidized wax which is the source of oxidized wax used for chemical combination with a hydroxylated low molal polyethylene is that in Part 5, following, certain limits are placed on the composition of initial reactants employed to produce the described composition. The initial reactants include the high molal polyethylene, the low molal hydroxylated polyethylene, and unoxidized wax. Thus, the relationship between oxidized wax containing, for instance, 2% to 7% of combined oxygen and the unoxidized wax from which it was obtained, is pertinent. Needless to say, if one oxidizes the wax for use in the present invention the increase of weight or loss of weight is obviously all that is required to make the appropriate calculation.

It should be borne in mind that in the oxidation of microcrystalline wax there also will be some loss in weight (as opposed to the gain in weight due to combined oxygen) due to the formation of volatile oxidation products which are lost during the oxidation. Normally the weight of oxidized products will be between 95% and 103% of the original unoxidized microcrystalline wax.

PART 5

As has been pointed out elsewhere, the peculiar properties exhibited by the herein described products which typify the invention cannot be obtained by mixing the three raw materials or reactants in any proportion. The proportions employed come within specific limits which have been set forth in Figure 1. When the percentages of microcrystalline wax (i.e., that which is oxidized to give a product which is esterified with the hydroxy low molal polyethylene plus that which is oxidized in the three-component blend), the hydroxy low molal polyethylene, and the high molal polyethyelne, are calculated it will be noted that they fall within the parallelogram E, F, G, H, in Figure 5. Examples of typical mixtures which can be subjected to oxidation in the manner described in Part 6 subsequently are as follows:

Example 1c

To 70 pounds of microcrystalline wax, obtained by refining the tank bottom residues from preferably East Texas crudes, is added 17 pounds of high molal polyethylene (average molecular weight of approximately 20,000) and 13.1 pounds of the low molal hydroxy polyethylene ester obtained in the manner described in Example 1b. The resultant mixture which normally is a little hazy is heated with agitation at 320° F. for two hours. During the blending process there appears to be a measurable gradual reduction in viscosity which seemingly indicates that perhaps there is a partial depolymerization of the polyethylene or some interaction between it and the other materials present. This material is very hard and forms firm hard gels in turpentine, mineral spirits, and other hydrocarbon solvents.

Example 2c

To 56 pounds of microcrystalline wax (190–195° F. melting points) is added 24 pounds of high molal polyethylene (average molecular weight approximately 22,000) and 20.1 pounds of low molal hydroxy polyethylene esters obtained in the manner described in Example 2b. The resultant mixture is heated to approximately 320° F. for 2 hours at which time a homogeneous mixture is obtained which is sometimes hazy but which shows no separation of constituents when cooled down. In this and other examples these materials can be blended at a lower temperature, for instance, 280° F. and lower but it will take a longer time to effect solution. At a higher temperature, for example, 350° F. solution can be effected in a shorter time with possibly some breakdown in the polymer chain.

Example 3c

To 60 pounds of a microcrystalline wax (190–195° F. melting point) is added 16 pounds of a high molal polyethylene (average molecular weight approximately 18,000) and 24 pounds of low molal polyethylene esters obtained in the manner described in Example 3b. The resultant mixture is heated to approximately 320° F. for 2 hours, at which time a homogeneous mixture is obtained which is sometimes hazy but which shows no separation of constituents when cooled down to room temperature.

Example 4c

To 58 pounds of a microcrystalline wax 190–195° F. melting point) is added 24 pounds of a high molal polyethylene (average molecular weight approximately 19,000) and 17.8 pounds of low molal polyethylene esters obtained in the manner described in Example 4b. The resultant mixture is heated to approximately 320° F. for 2 hours, at which time a homogeneous mixture is obtained which is sometimes hazy but which shows no separation of constituents when cooled down to room temperature.

PART 6

SECTION A

This part is concerned with the gaseous oxidation of mixtures which have been described in Part 5, preceding. This part will be divided into two sections, Section A dealing with illustrative examples and Section B concerned with the possible reactions which are involved.

Example 1d

To the product of Example 1c is added .5 pound of cobalt naphthenate. The resultant mixture is blown with air at a rate of 5 ml./g./min. until the product shows an acid number of 16. This latter step requires normally about 65 hours but this lengthy time can be considerably reduced by the use of oxygen enriched air or pure oxygen. The product of this example is a light orange color, is easily emulsifiable and has a penetration of 2 as measured by the procedure outlined by the A.S.T.M. Test Method D5–25, using a 100 g. weight and a temperature of 25° C.

Figure 5:
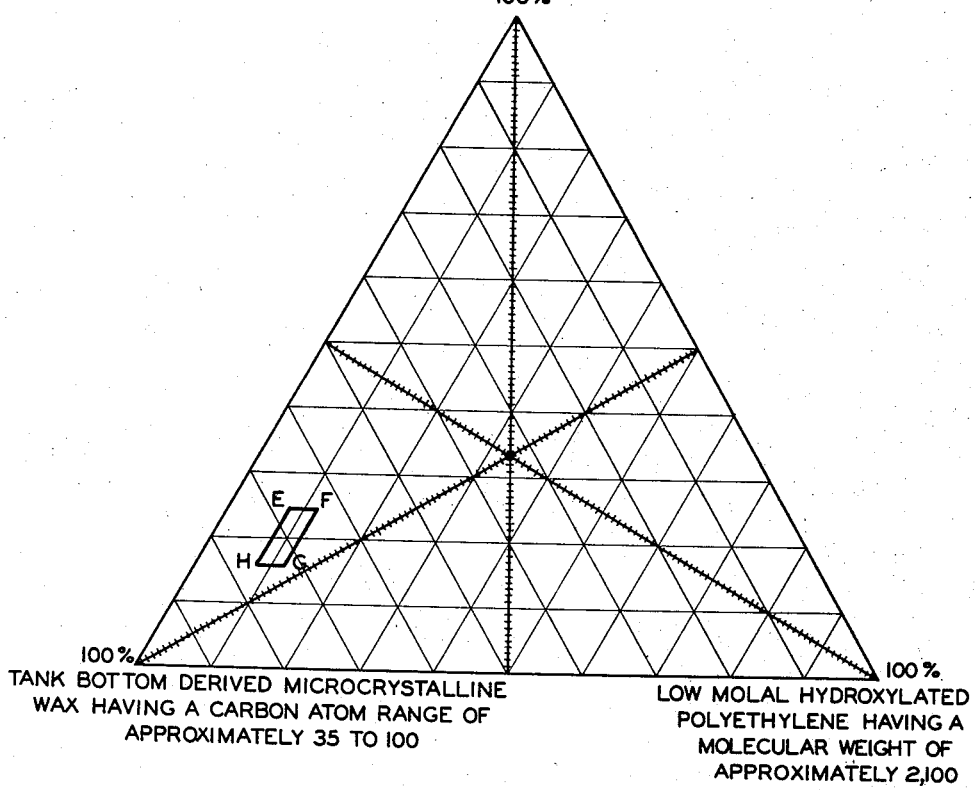

When the percentages of microcrystalline wax (i.e., that which is oxidized to give a product which is esterified with the hydroxy low molal polyethylene plus that which is oxidized in the three-component blend), the hydroxy low molal polyethylene, and the high molal polyethylene, are calculated for this example, it will be noted that they fall within the parallelogram E, F, G, H, in Fig. 5.

Example 2d

To the product obtained from Examle 2c is added .5 pound of manganese naphthenate. The mixture is heated to 270° F. and air is blown through at a rate of 5 ml./g./min., maintaining the temperature at 260–280° F., until an acid number of about 25 is obtained. The average time required is about 75 hours. It has been found that it is not necessary to add all the polyethylene before the air is turned on and in fact it is often of advantage when higher percentages of polyethylene are used, especially of the high molal type, to add part of it after the oxidation has progressed for, say 8 hours.

The same product is obtained using a wax-insoluble catalyst such as potassium permanganate (introduced as an aqueous solution) instead of the manganese naphthenate. The product of this example is an orange color and is very hard, having a penetration value of between one and two as measured by the A.S.T.M. Test Method D5–25. It has a saponification number of between 60 and 75 and may be easily emulsified by the procedure described in Part 7 of this application to give a stable emulsion in water, which emulsion upon drying will give a hard tough and glossy film.

When the percentages of microcrystalline wax (i.e., that which is oxidized to give a product which is esterified with the hydroxy low molal polyethylene plus that which is oxidized in the three-component blend), the hydroxy low molal polyethylene, and the high molal polyethylene, are calculated for this example, it will be noted that they fall within the parallelogram E, F, G, H, in Figure 5.

Example 3d

To the product from Example 3c is added .5 pound of manganese stearate. After this mixture is heated to 300° F., air is introduced at a rate of approximately .5 ml./g./min. until an acid number of about 10 is obtained (about 40 hours). The temperature is then reduced to 240–250° F. and the oxidation is continued until the acid number reaches approximately 17 (about 15 hours). By the use of this procedure a light orange, hard, emulsifiable wax is obtained having a saponification value of 45–55. If this oxidation reaction is run at a temperature of 260–280° F. rather than starting the oxidation at a higher temperature and then lowering it, a product is obtained having a lower saponification to acid number ratio. Although this latter product can be emulsified to give a stable emulsion with very desirable properties, a wax having a higher saponification to acid number ratio may be more easily emulsified with water.

When the percentages of microcrystalline wax (i.e., that which is oxidized to give a product which is esterified with the hydroxy low molal polyethylene plus that which is oxidized in the three-component blend), the hydroxy low molal polyethylene, and the high molal polyethylene, are calculated for this example, it will be noted that they fall within the parallelogram E, F, G, H, in Fig. 5.

Example 4d

When the procedure of Example 2d is employed using the product from Example 4c with .5 pound of manganese naphthenate, an orange colored product is obtained that has a penetration of one as measured by the A.S.T.M. Test Method D5–25 when it has been oxidized to an acid number of 15 and a saponification number of between 35–45. The time required for this reaction is from 60 to 75 hours.

When the percentages of microcrystalline wax (i.e., that which is oxidized to give a product which is esterified with the hydroxy low molal polyethylene plus that which is oxidized in the three-component blend), the hydroxy low molal polyethylene, and the high molal polyethylene, are calculated for this example, it will be noted that they fall within the parallelogram E, F, G, H, in Figure 5.

SECTION B

The present invention is concerned with the resultant obtained by reactions of the kind specified in regard to a tertiary mixture, one component being tank bottom-derived microcrystalline waxes and preferably derived from East Texas crude along with a high molal polyethylene, and the ester derived from low molal hydroxy polyethylene and oxidized microcrystalline wax. There are a number of suitable references which indicate as far as the oxidizing of tank bottom waxes goes, when oxidation takes place under conditions herein described that there is considerable change as, for example, conversion so the product shows an acid number of 30, a saponification number of 90, along with a combined oxygen content of approximately 5%. Obviously there are formed alcohols, and then acids and then esters, although this is an over-simplification which does not take into consideration other products which might be formed. For instance, reference is made to U.S. Patent No. 2,128,523, dated August 30, 1938, to Burwell. In discussing the oxidation of waxes under conditions akin to those herein employed with certain modifications there is stated the following.

"The process above described is that disclosed in Patent Nos. 1,690,768 and 1,690,769, granted to Arthur W. Burwell. The resulting reaction product is a mixture of a great number of different compounds which may, for clarity, be grouped thus:

(1) Unoxidized (i.e., 'original') hydrocarbons;
(2) Aliphatic alcohols, largely secondary and tertiary;
(3) Aliphatic ketones;
(4) Keto-alcohols;
(5) High molecular weight saturated aliphatic carboxylic and hydroxycarboxylic acids; etc.; and
(6) Neutral esters and lactones derived from the aforesaid acids and the aforesaid alcohols, or from the aforesaid acids, respectively.

"Differently grouped, the mixtures are separable broadly into (a) saponifiables and (b) unsaponifiables: into the latter group fall the alcoholic and ketonic compounds aforesaid (and, of course, the unoxidized hydrocarbons), whereas the acids, esters and lactones are grouped as saponifiables."

Normally in the oxidation of conventional polyethylene particularly polyethylene having a molecular weight in excess of 12,000 and most characteristically a polyethylene of the kind that is commonly used in wax compounds, such as polyethylene of the 12,000 to 32,000 molecular weight range, one finds that the same reactions take place along with other reactions, to wit, polymerization, extensive oxidative degradation or depolymerization or the equivalent. We are inclined to think that the initial attack occurs at a tertiary or secondary position so as to eventually form alcohols and then these are further oxidized with rupture of the polyethylene molecule to form acids or other oxidation products which may again be further degraded by similar means. In other words, in oxidation of a polyethylene having a molecular weight in the 12,000 to 32,000 range, there is no question but what in the final stages, and perhaps after considerable change in color, one does obtain products in which, to a large extent and perhaps entirely, the initial structural units represent products having a molecular weight in the neighborhood of 4,000, 3,000 or 2,000, or less, i.e., the polyethylene unit seems to be degraded into a number of smaller molecules.

Figure 2:
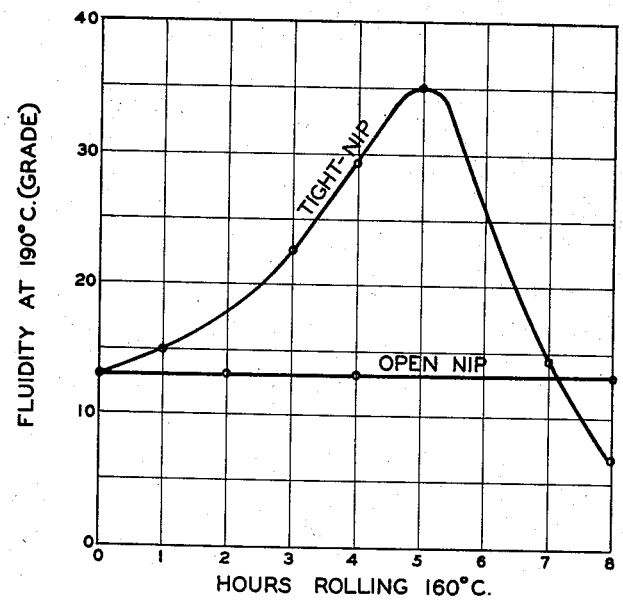
Figure 3:
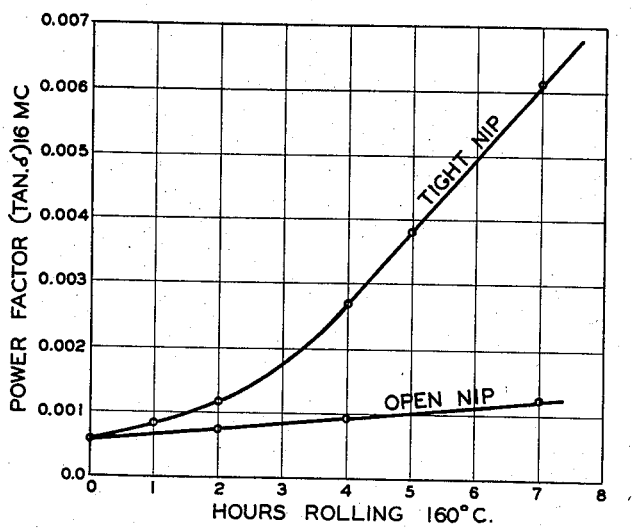

As to the oxidation of polyethylene reference is made to Midwinter, British Plastics, May 1945, pp. 208–214 and 228. For purpose of convenience, two drawings appearing in the article are herewith produced as Figures 2 and 3. As stated in the article, the Figures herein identified as 2 and 3 show the effect of milling polyethylene in air at 160° C. Both power factor and fluidity show very marked changes when polyethylene is rolled with a tight nip and constantly changing surface (good mixing), but no appreciable differences are noted when polyethylene is rolled with an open nip so that the movement of the bank between the rolls is reduced to a minimum (poor mixing).

Reference is made to the pamphlet "Alkathene" which is the brand of polyethylene marketed by the Plastics Division of Imperial Chemical Industries Limited. The reference to Alkathene has not significance other than that it is a reference to a polyethylene of the conventional type having molecular weight range from approximately 12,000 to 32,000. The statement is as follows:

"When 'Alkathene' is processed in air below 125° C. for periods up to about eight hours, its physical and electrical properties are scarcely affected, but at higher temperatures, or after a longer time, oxidation occurs.

"Oxidation causes an increase of power factor and an increase or decrease in fluidity, sometimes accompanied by discoloration. Thus, heating in limited amounts of oxygen causes cross-linking of polymer molecules and, therefore, a toughening of the product to a rubber-like mass. On the other hand, heating in excess oxygen involves molecular degradation and a decrease in melt viscosity.

"In mill mixing the rate of oxidation increases with increase in the temperature and the rate of shear in the nip."

It is very questionable that oxidation as herein conducted on a binary mixture of tank bottom-derived wax and high molal polyethylene would produce a composite in which there were comparatively small units having 50 to 75 carbon atoms derived from the wax and large units having perhaps 1200 carbon atoms derived from the polyethylene. This does not mean that trans-esterification or esterification could not take place, at least theoretically, between the acids of the wax and the alcohols of the high polymer molecule; or, inversely, between the acids of the high molal polyethylene and the alcohols of the low molal wax but there is the reaction which probably takes place at an intermediate point, to wit, the break down or cleavage of the polyethylene (probably after hydroxylation) and thus a mixture if one proceeded as herein described omitting the low molal polyethylene (the polyethylene having a molecular weight of 2000 or thereabouts) would actually result, at least to a substantial degree and perhaps entirely in mixed esters derived from the low molal wax and the polyethylene obtained by oxidative degradation or depolymerization, i.e., degradation polymer units having a molecular weight in the neighborhood of 2,000 to 4,000.

When a three-component system, to wit, an ester product formed from the low molal polyethylene and an oxidized microcrystalline wax, a high molal polyethylene, and a microcrystalline wax, is subjected to oxidation conditions we obtain a product which has more desirable properties than that obtained from the binary system just before hand mentioned. Although it is a matter of speculation it is felt that the difference herein noted in the prior esterification and oxidation is due to the terminal hydroxyl groups which are probably present in the low molal polyethylene and which are probably not formed in the oxidized wax or polyethylene.

These terminal polyethylene alcohols are to a large extent esterified with an oxidized microcrystalline wax as described in Part 4 of the invention, either by direct esterification or an alcoholysis reaction. To an extent it is believed that these so formed esters are less susceptible to further oxidation than the free polyethylene alcohols and thus by carrying out the oxidation in this manner (i.e., esterifying the polyethylene alcohol first) higher molecular weight esters are formed. If these esters are oxidized it would be expected that the oxidation attack would occur at the position of the ester group (terminal position) so as to oxidatively cleave the ester. In this manner little chain cleavage of the polyethylene chain would be expected when the polyethylene part of the ester is attacked to presumably form an acid. In turn, the so formed acid may be further reacted by various means (i.e., esterification, acidolysis, oxidation). Any unesterified terminal polyethylene alcohols can be oxidized to acids and these converted to esters, etc., as just stated.

The products herein obtained as far as we are aware involve a procedure not suggested previously elsewhere. Emphasis appears to be indicated in regard to what has been just said, not so much from the standpoint of differentiating from other processes, but rather to offer some explanation, whether logical or speculative, as to why the herein described procedure gives products of unusual value for numerous purposes. The reason for this is the following:

(a) We use both a high molal polyethylene and an ester product formed from a low molal hydroxy polyethylene and an oxidized microcrystalline wax.

(b) As far as we know no one has suggested previously the esterification of a hydroxy low molal polyethylene with an oxidized microcrystalline wax and then subjecting this product to oxidation conditions.

(c) Over and above this the total amount of polyethylene employed is not such small amount or small ratio as is sometimes employed but is a substantial amount, for instance, approximately one-quarter as much or more of the amount of wax employed;

(d) We do not find we can replace the polyethylene with other polymers such as vinyl polymers, butadiene polymers, butylene polymers, or the like—the properties obtained seem to be obtainable from polyethylene only;

(e) Desirable properties of the kind hereinafter described seem to be limited to an extremely narrow combination, i.e., the percentages of materials which come within the area of the parallelograms in Figures 1 and 5;

(f) Finally, so far as we are aware, no such combination as specified above has been subjected, not merely to bare oxidation or minimum oxidation but to controlled oxidation so as to obtain a final product having an acid number of at least 12, a saponification number of at least 35 and combined oxygen content of not less than 2%. The upper limit for the acid number is approximately 35; for the saponification number approximately 90, and for the combined oxygen content approximately 7%.

Numerous catalysts may be successfully employed in this invention to effect oxidation. In general these catalysts are composed of salts of the transition metals and, more specifically, salts of cobalt, manganese and iron. We prefer to use wax soluble catalysts of these elements, such as the naphthenate, stearate, oleate, etc. Another very effective catalyst is potassium permanganate. This material is wax insoluble and it is best to add it in the form of an aqueous solution and then allow the water to evaporate from the wax mixture.

The mixture composed of microcrystalline wax, high molecular weight polyethylene and the ester derived from hydroxy low molecular weight polyethylene and oxidized microcrystalline wax is oxidized by an oxygen-containing gas in this invention. We normally employ air because of convenience. However, oxygen, or air enriched with oxygen, will give a gas which would work equally as well. We have noted that when a gas high in oxygen content is employed, the oxidation proceeds at a much more rapid rate and as a result a lower gas rate can be employed. Ozone can be added to the oxygen-containing gases which aids in the oxidation procedure.

What is said herein as to the initial component mixtures which is subjected to drastic oxidation it may be noted that such mixture can be combined with small amounts of certain other wax-soluble polymers mentioned elsewhere, such as paracoumarone resin, indene resin, terpene resin, or the like, to give analogous products. Note that in such instance neither the high molol polyethylene or the ester derived from low molal hydroxy polyethylene and oxidized microcrystalline wax can be replaced by some other polymer but some other polymer in comparatively small amounts, for instance, ¼% to 5% may be added and at least in some instances give somewhat modified properties. Such four-component combination is not part of the present invention.

Similarly, another four-component combination which is not part of the present invention, involves the use of a polybutylene and particularly one which is a solid at ordinary room temperatures. Such solid polybutylenes have either one or both of two characteristics, i.e., a stickiness or tackiness and, secondly, a rubbery body. Actually, we have prepared products using a four-component system, i.e., those above enumerated along with solid polybutylene in small amounts, for instance, 1% to 5% by weight of the total mix and the resultant product gives excellent floor polishes which, in addition to the usual desirable qualities was particularly valuable from the standpoint that it seemed to be slip-proof.

PART 7

The products of this invention have many uses, but they are especially valuable for the preparation of emulsions which, when spread on a surface, leave a hard tough film having a high gloss.

These aqueous emulsions may be made by various methods, e.g., wax to water, water to wax, etc., employing numerous emulsifying agents. One suitable procedure is as follows:

*Example 1e*

100 grams of an oxidized product of this invention and 12 grams of oleic acid are blended with agitation and to this blend at 200–205° F. are added 7.6 grams of morpholine. Water at 200–210° F. is at first added very slowly to the above blend kept at 200–210° F. First a heavy gel forms which inverts to the oil-in-water type of emulsion and at this time the rate of water addition can be increased. To make an emulsion containing 12% solids, 816 grams of water should be used in this procedure. To this emulsion should be added 5% to 10% of a 12% ammoniacal shellac solution (or a comparable material) to improve the leveling properties of the emulsion.

It may be necessary to vary the proportions of the emulsifying agents depending upon to what extent the polyethylene wax blends are oxidized. This emulsion also can be made by the wax-to-water method although the resultant emulsion is not as good.

In addition various other ingredients may be used in these emulsions as synthetic resins, such as those obtainable on the open market and recognized for this use by the trade, or various vegetable waxes.

*Example 2e*

25 grams of the product of this invention, 25 grams of an oxidized microcrystalline wax produced by several manufacturers (180–185° F. melting point, 4–6 penetration, 4–5 N.P.A. color, 20–25 acid number, and 55–65 saponification number), 25 grams of a phenol-terpene resin of the type used by floor polish manufacturers, 25 grams of carnauba wax and 10 grams of oleic acid, are heated together at temperatures up to 250° F. until a solution is obtained. The mixture is cooled to 210° F. with agitation. 7.2 grams of 2-amino-2-methyl-1-propanol are added with stirring at 200° F., followed immediately by addition of 4 grams of borax in a saturated solution. This mixture is heated at 200° to 210° F. for five minutes and then the melt is slowly poured into water at 200° to 210° F. with rapid agitation. When the emulsion has smoothed out a 12% solution of leveling agent is added with agitation.

These finished emulsions can be spread on a surface such as linoleum, to give a finish which dries to a high gloss without buffing. This wax film is hard and tough and as a result is resistant to scuffing.

The wax products of the invention may be used in other emulsions such as those used for furniture or automobile polishes to give hard glossy films.

Because of the high melting point and good hardness of the product of this patent application these waxes are also valuable for additives to other waxes to impart to varying extents these desirable characteristics.

These wax materials also find use as additives to lubricating greases or as additives in various hydrocarbon coatings for metals where, in addition to enhancing the physical properties, they also have a tendency to inhibit corrosion.

The percentage of oxygen as reported in the invention is best determined by a carbon and hydrogen analysis. Since these oxidized materials are essentially composed of carbon, hydrogen and oxygen, the percentage of oxygen is equal to 100% minus the sum of the percent of carbon and hydrogen. There will be, of course, a trace of other materials such as that contributed by the metal catalyst (approximately 0.03%), metals from the reaction vessel (these contribute less than 0.01%) and other elements such as nitrogen and sulfur (usually less than 0.01%). An approximate value for the percentage of oxygen can be calculated by using the saponification number, hydroxyl value, and carbonyl value. Most of the oxygen is in the form of acids and esters, so an idea of the oxygen content can be determined from the saponification value.

Having thus described our invention, what we claim as new and desire to secure by Letters Patent, is:

1. The process of oxidizing a three-component mixture consisting of (A) refined tank bottom-derived microcrystalline was having a carbon atom range of approximately 35 to 100; said wax being characterized by the following characteristics: (aa) oxidation susceptible in conventional gaseous oxygen-containing oxidation procedure; (bb) immiscible with polystyrene of molecular weight range of 5,000 to 10,000 at approximately 160° C., and (cc) has not been rendered oxidation susceptible by subjecting to treatment with a member of the class consisting of a metallic halide, hydrochloride acid and chlorinated hydrocarbon; (B) esters obtained by reaction between a low molal polyethylene having a molecular weight of approximately 2,100; said polyethylene having a terminal hydroxyl group, said hydroxylated polyethylene being produced by polymerizing ethylene under 426–475 atmospheres at temperatures between 140° and 200° C. in the presence of isopropanol and hydrogen peroxide, and mixed acids and esters thereof having a saponification value between 35 and 100 and obtained by oxidation of a microcrystalline wax as described in (A) above; (C) a normal commercial polyethylene defined by the small shaded rectangular band of Figure 4; in such weight proportions so that the average composition of said initial reactants lies approximately within the parallelogram A, B, C, D, of the accompanying drawing, Figure 1; said oxidation comprising oxidizing with an oxygen-containing gas in presence of not over 2% of a conventional oxidation-promoting catalyst at a temperature above 212° F. within the range of about 240° F. to 300° F. for a period of time of about 55 to about 75 hours in gas flow rate to cause formation of (a) hydroxyl containing molecules; (b) carboxyl containing molecules, followed by (c) esterification, and (d) subsequent reactions including at least one of the following, alcoholysis and ester interchange; said resultant product having an acid number of not less than 12, and a saponification number of not less than 35, and having a combined oxygen content of not less than 2%; with the proviso that the initial ratio of high molal polyethylene, low molal hydroxylated polyethylene, and all refined tank bottom-derived microcrystalline wax entering into the final reaction mass be within the limits defined by the parallelogram E, F, G, H, in Figure 5.

2. The product obtained by the process defined in claim 1.

3. The process of claim 1 with the proviso that the acid number be not over 36; that the saponification number be not over 90, and that said oxidation be at least sufficient so that the end composition obtained is characterized by the property of forming stable emulsions in water, which emulsions upon drying form highly glossy films.

4. The product obtained by the process defined in claim 3.

5. The process of claim 1 with the proviso that the acid number be not over 35; that the saponification number be not over 90, and that said oxidation be at least sufficient so that the end composition obtained is characterized by the property of forming stable emulsions in water, which emulsions upon drying form highly glossy films, and with the added proviso that the oxidation-promoting catalyst be a wax-soluble organic salt of a member of the class selected from cobalt and manganese, and with the further proviso that the amount of said catalyst be not over 1% by weight of the oxidation susceptible mixture.

6. The product obtained by the process defined in claim 5.

7. The process of claim 1 with the proviso that the acid number be not over 35; that the saponification number be not over 90, and that said oxidation be at least sufficient so that the end composition obtained is characterized by the property of forming stable emulsions in water, which emulsions upon drying form highly glossy films, and with the added proviso that the oxidation-promoting catalyst be a member of the class selected from cobalt naphthenate and manganese naphthenate with the further proviso that the amount of said catalyst be not over 1% by weight of the oxidation susceptible mixture.

8. The product obtained by the process defined in claim 7.

References Cited in the file of this patent

UNITED STATES PATENTS

| | | |
|---|---|---|
| 1,983,672 | Labarthe et al. | Dec. 11, 1934 |
| 2,426,248 | Sugarman | Aug. 26, 1947 |
| 2,471,102 | Fish | May 24, 1949 |
| 2,504,400 | Erchak | Apr. 18, 1950 |
| 2,698,309 | Thwaites et al. | Dec. 28, 1954 |

FOREIGN PATENTS

| | | |
|---|---|---|
| 581,279 | Great Britain | Oct. 7, 1946 |